United States Patent [19]

Nelson et al.

[11] 3,796,943
[45] Mar. 12, 1974

[54] CURRENT LIMITING CIRCUIT

[75] Inventors: Carl T. Nelson, Sunnyvale; Robert C. Dobkin, Menlo Park, both of Calif.

[73] Assignee: National Semiconductor Corporation, Santa Clara, Calif.

[22] Filed: Jan. 2, 1973

[21] Appl. No.: 319,994

[52] U.S. Cl. ................................. 323/9, 317/33 VR
[51] Int. Cl. ............................................. G05f 1/58
[58] Field of Search ............... 317/31, 33 VR; 323/9

[56] References Cited
UNITED STATES PATENTS

| | | | |
|---|---|---|---|
| 3,396,326 | 8/1968 | Kisrow | 323/9 |
| 2,888,633 | 5/1959 | Carter | 323/9 |
| 3,405,319 | 10/1968 | Barringer | 323/9 UX |
| 3,521,150 | 7/1970 | Bates | 323/9 |
| 3,513,378 | 5/1970 | Kemper | 323/9 |
| 3,078,410 | 2/1963 | Thomas | 323/9 X |

*Primary Examiner*—A. D. Pellinen

[57] ABSTRACT

A current sense voltage is derived which is proportional to the current to be limited. The current sense voltage is applied in phase opposition to a difference voltage obtained by opposing the base-to-emitter diode voltage drops of a temperature compensating transistor and a current control transistor for substantially reducing the value of the current limit sense voltage necessary to cause current limiting. Temperature compensation is obtained by superimposing a selected temperature compensating portion of the base-to-emitter diode drop of a temperature compensating transistor on the base-to-emitter turnon voltage of the current control transistor, whereby any desired temperature coefficient including zero is obtained for the current limiting circuit over the operating temperature range of −55° C to +125° C.

22 Claims, 23 Drawing Figures

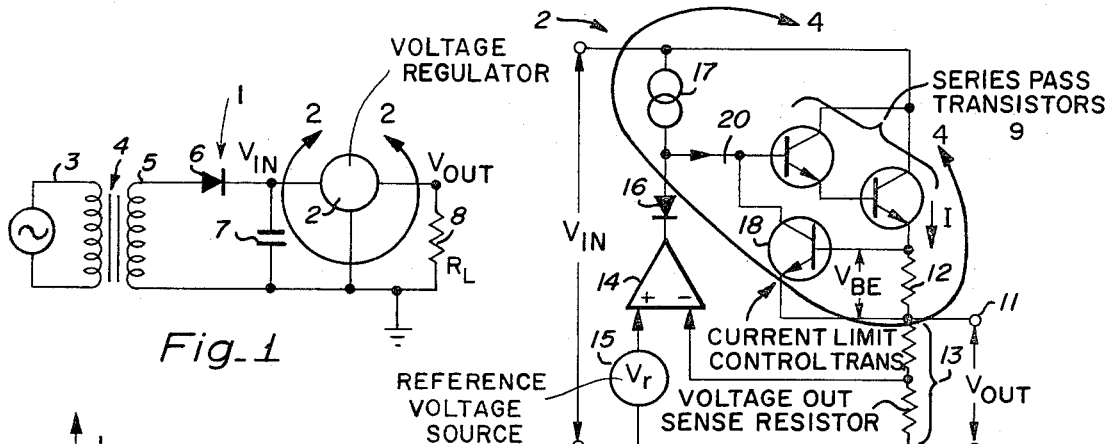
Fig_1
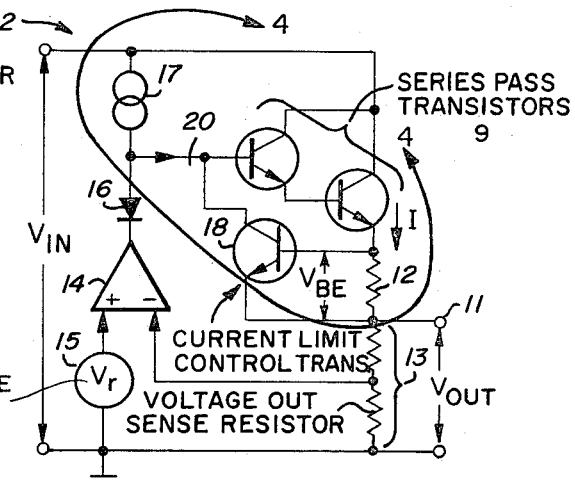
Fig_2 PRIOR ART
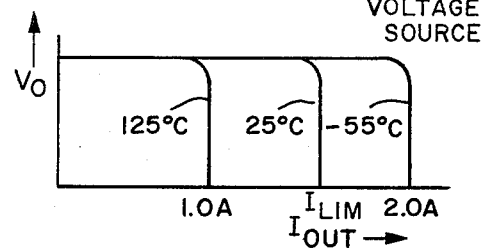
Fig_3 PRIOR ART
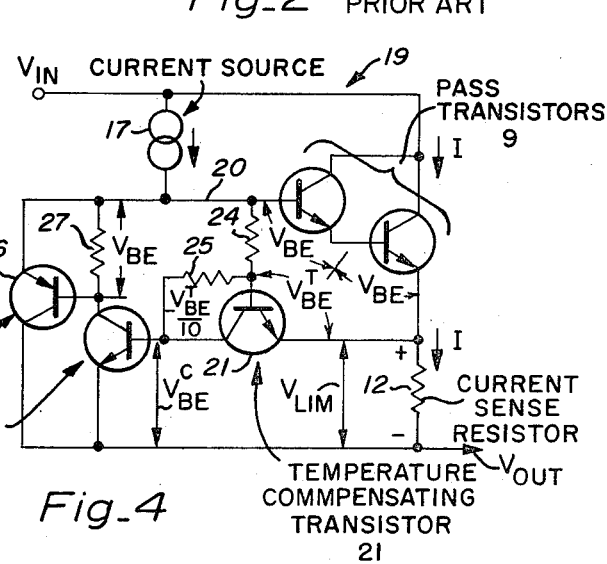
Fig_4
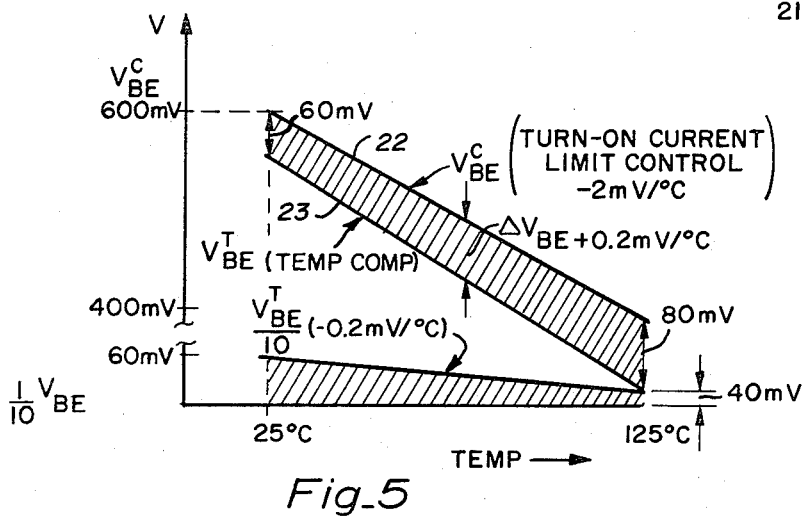
Fig_5

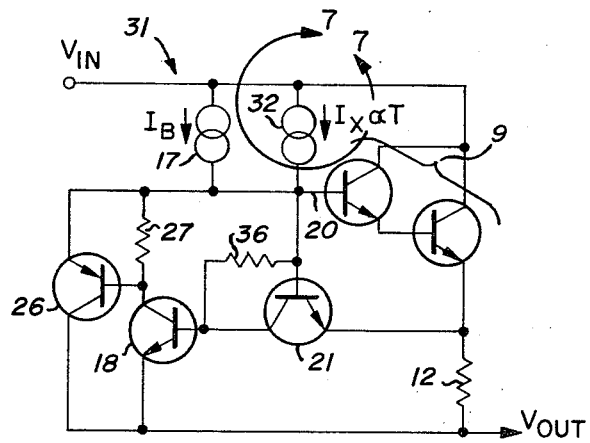
Fig_6
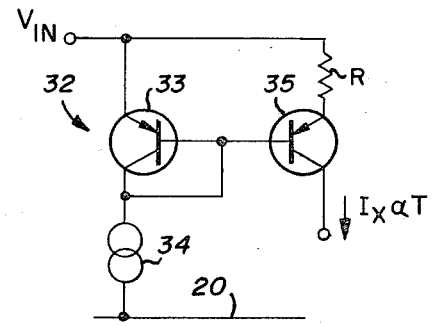
Fig_7
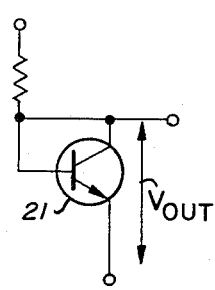
Fig_8
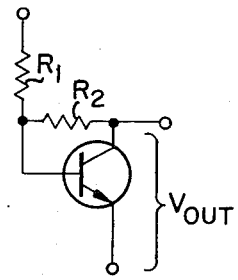
Fig_9
Fig_10
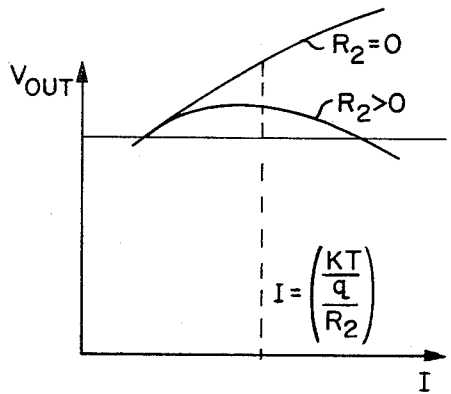
Fig_11
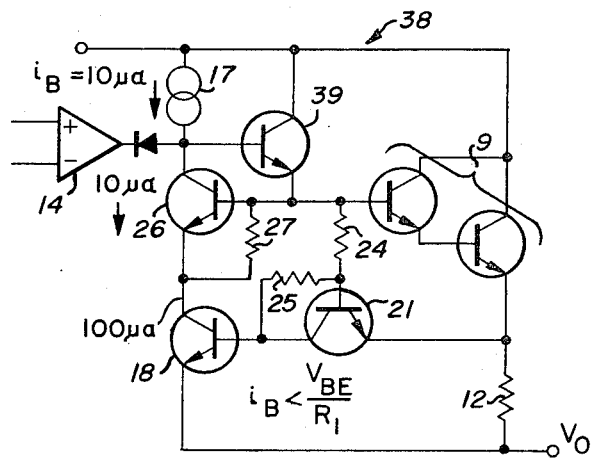
Fig_12

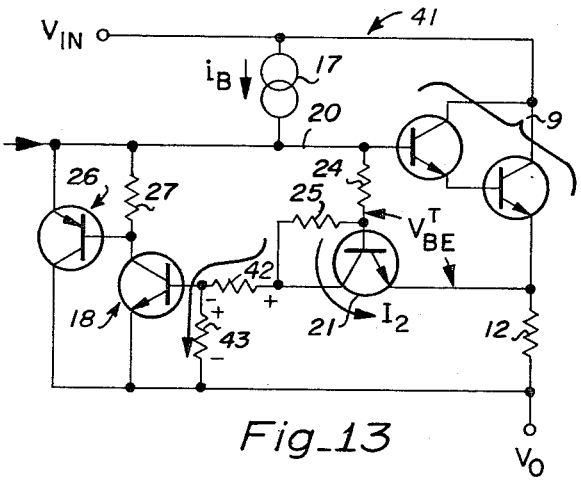
Fig_13
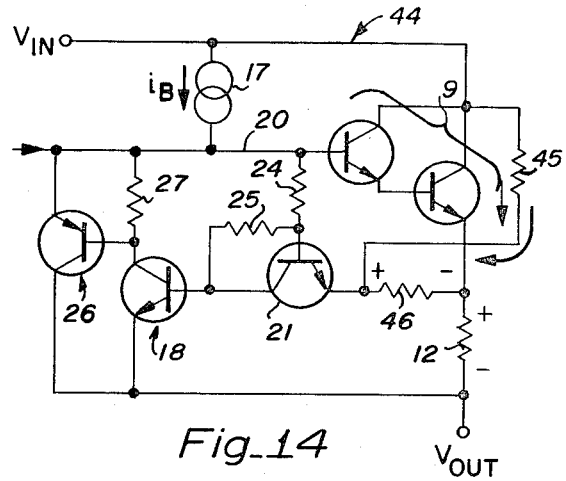
Fig_14
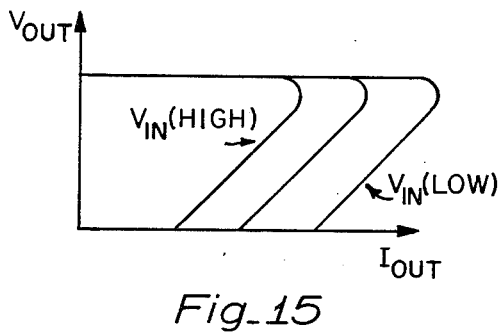
Fig_15
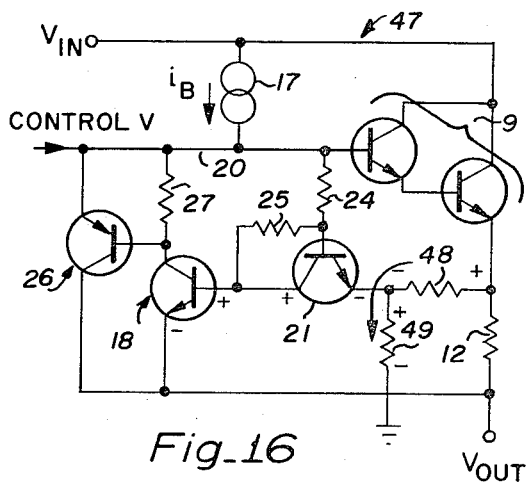
Fig_16
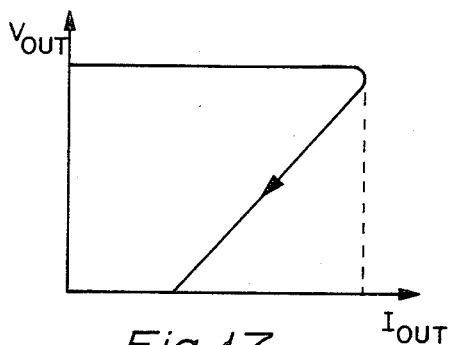
Fig_17
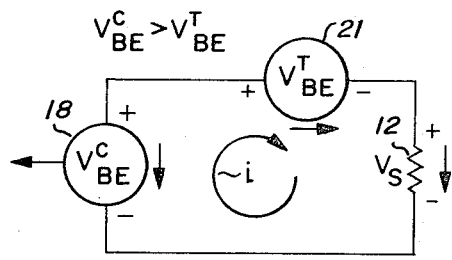
Fig_18
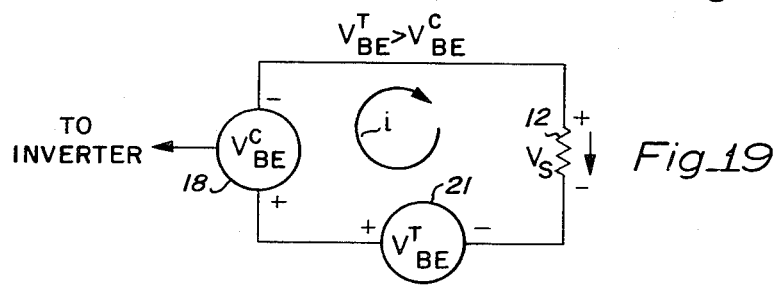
Fig_19

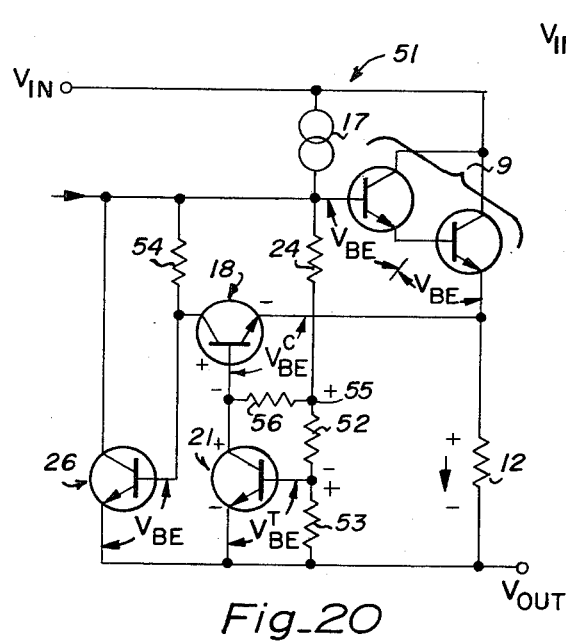
Fig_20
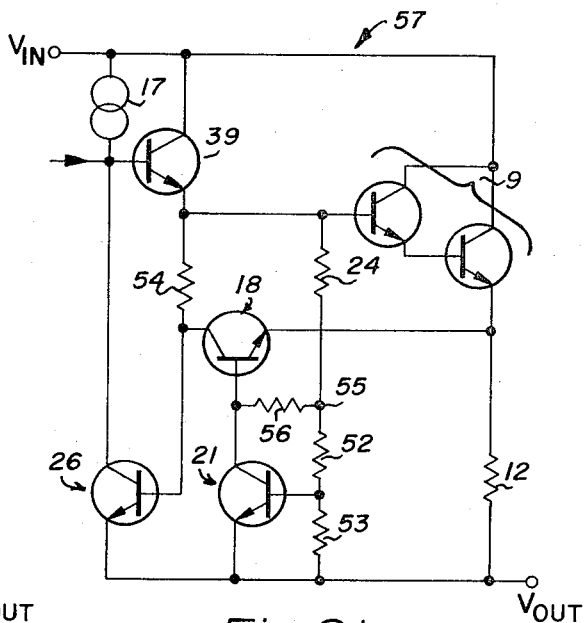
Fig_21
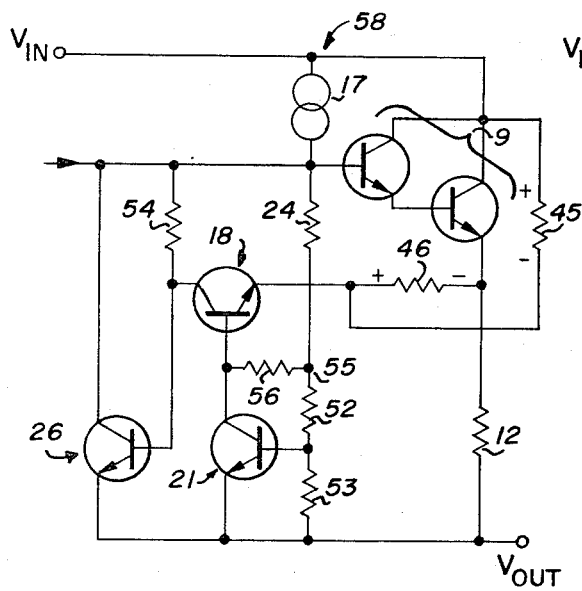
Fig_22
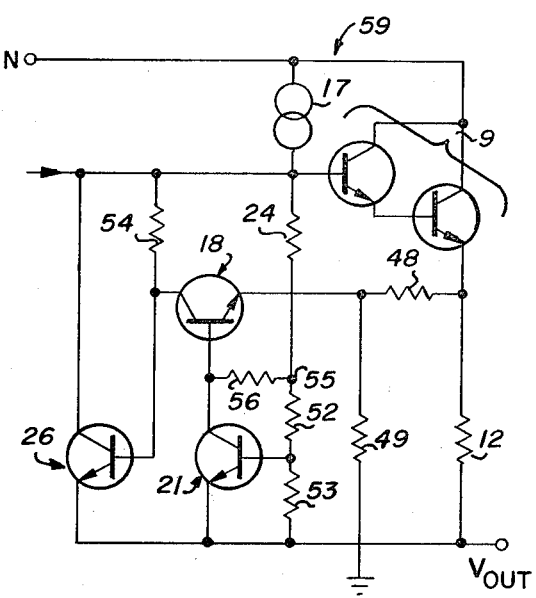
Fig_23

# CURRENT LIMITING CIRCUIT

DESCRIPTION OF THE PRIOR ART

Heretofore, current limiting circuits have utilized all of the base-to-emitter turn-on voltage of a bipolar control transistor in phase opposition to the current limit sense voltage for turning on the current limit control transistor. The problem with this prior art current limiting circuit is that it is wasteful of power because the base-to-emitter turn-on voltage is approximately 0.65 volts at 25° C. When such a current limiting circuit is employed for regulating high current, the voltage sense resistor through which the output current flows dissipates considerable power. It would be desirable to reduce the current limiting sense voltage to produce a substantial reduction in the power consumed in the current limiting sense resistor. For example, in the case of a 40 amp regulator, reducing the current sense voltage to 100 millivolts reduces the dissipation in the current limit sense resistor from 26 watts to 4 watts. In addition, the reduced current limit sense voltage allows the regulator to operate with lower input voltages because the current limit sense voltage adds directly to the minimum input voltage required to operate the regulator. This reduces the power dissipation in the pass transistor section of the regulator.

Another problem with the prior art current limiting circuit is that the base-to-emitter turn-on voltage of the control transistor is highly temperature dependent, having a negative temperature coefficient such that over the range from −55° C to +125° C, the current limit value halves, that is, if the circuit limited at 2 amps at −55°C, the circuit would limit at 1 amp at +125°C. Thus, it is desirable to provide a current limiting circuit having a substantially zero temperature coefficient.

SUMMARY OF THE PRESENT INVENTION

The principal object of the present invention is the provision of an improved current limiting circuit.

In one feature of the present invention, the base-to-emitter diode voltage drop of a bipolar current limiting control transistor is connected in phase opposition to a second diode voltage drop of a different magnitude, whereby the difference (current sense control) voltage is substantially reduced and made to have a positive temperature coefficient of about 0.3%/° C.

In another feature of the present invention, a selected portion of a temperature compensating diode drop is applied in circuit with the turn-on voltage drop of the control transistor and with the temperature compensating diode voltage drop, whereby a selected temperature coefficient for the current limiting circuit is obtained which may be selected to provide a negative or positive coefficient or a zero coefficient.

In another feature of the present invention, the temperature compensating diode drop is driven with current derived from a temperature dependent current source such that the current through the diode junction increases with temperature to provide a temperature coefficient just cancelling the temperature coefficient of the difference voltage between the temperature compensating diode and the control transistor.

In another feature of the present invention, the temperature compensating diode junction voltage drop is provided by a transistor having its base connected to its collector such that the transistor acts like a diode.

In another feature of the present invention the temperature compensating diode voltage drop is obtained by a transistor connected as a diode except that a resistor is connected between the base and collector terminals of the transistor such resistor having a resistance equal to the resistance of the equivalent diode, whereby the diode voltage drop is rendered insensitive to small variations in the current passing through said diode-connected transistor.

In another feature of the present invention, the current limiting control transistor turns on a shunting transistor for shunting the drive current from the base of a series pass transistor which passes the output current through the current limit sensing resistor to the output of the circuit.

In another feature of the present invention, the series pass transistor network for passing the current to the output terminal of the current limiting circuit includes three stages of current amplification each stage comprising a transistor with the base-to-emitter terminals of said three stages being connected in series and with the emitter terminal of the first stage providing the current source for both the current limiting control transistor and the temperature compensating diode junction. The output of the current limiting control transistor serves to turn on a shunting transistor for shunting a relatively small constant current source from the base of the first pass transistor stage, whereby the current limiting control circuitry is operated from a current source other than that of the small constant current source and whereby the constant current source is of relatively low amperage for ease of fabrication and ease of stabilizing in monolithic circuits.

In another feature of the present invention, a voltage divider network monitors the voltage across the output pass transistor of the current limiting circuit and a portion of the sensed voltage is applied in phase addition with the current sense voltage and in phase opposition to the difference voltage between the base-to-emitter drops of the current control transistor and temperature compensating transistor, whereby excessive power dissipation in the output pass transistor is avoided in use.

In another feature of the present invention, the output voltage of the current limited circuit is monitored to derive a voltage in accordance therewith and the derived voltage is applied in phase opposition with the current sense voltage to reduce the current limiting value as the output voltage is reduced.

In another feature of the present invention the base-to-emitter voltage drop of the temperature compensating transistor is greater than the base-to-emitter turn-on voltage drop of the current control transistor such that current limiting sense voltage serves to turn off the current control transistor. The output of the current control transistor is inverted for performing the current limiting function, whereby an all npn circuit is obtained.

Other features and advantages of the present invention will become apparent upon a perusal of the following specification taken in connection with the accompanying drawings wherein:

BRIEF DESCRIPTION OF THE DRAWINGS

FIG. 1 is a schematic circuit diagram of a voltage regulator circuit incorporating features of the present invention, FIG. 2 is a more detailed schematic circuit diagram, partly in block diagram form, of a prior art current limited voltage regulator portion of the circuit of FIG. 1 and delineated by line 2—2, FIG. 3 is a plot of voltage output versus current output for the prior art regulator of FIG. 2, FIG. 4 is a schematic circuit diagram of that portion of FIG. 2 delineated by line 4—4 and modified to include the current limiting circuit of the present invention, FIG. 5 is a plot of voltage versus temperature depicting the temperature dependence of certain of the voltage generated within the circuit of FIG. 4, FIG. 6 is a schematic circuit diagram similar to that of FIG. 4 depicting an alternative embodiment of the present invention, FIG. 7 is a schematic circuit diagram of a portion of the circuit of FIG. 6 delineated by line 7—7, FIG. 8 is a schematic circuit diagram of a transistor connected as a diode, FIG. 9 is a schematic circuit diagram of a transistor connected as a diode and including a compensating resistor connected between the base and collector electrodes, FIG. 10 is a schematic circuit diagram of a series connection of a resistor and a diode, FIG. 11 is a plot of collector to emitter voltage versus collector current for the circuit of FIG. 9 for two values of resistance for $R_2$, FIG. 12 is a schematic circuit diagram similar to that of FIG. 4 depicting an alternative embodiment of the present invention, FIG. 13 is a schematic circuit diagram similar to that of FIG. 4 depicting an alternative embodiment of the present invention, FIG. 14 is a schematic circuit diagram similar to that of FIG. 4 depicting an alternative embodiment of the present invention, FIG. 15 is a plot of voltage output versus current output for the circuit of FIG. 14, FIG. 16 is a schematic circuit diagram similar to that of FIG. 4 depicting an alternative embodiment of the present invention, FIG. 17 is a plot of voltage output versus current output for the circuit of FIG. 16, FIG. 18 is a simplified loop diagram representative of the temperature compensating circuit portion of the circuits of FIGS. 4, 6, 12, 13, 14 and 16, FIG. 19 is a circuit diagram similar to that of FIG. 18 depicting an alternative embodiment of the present invention, FIG. 20 is a schematic circuit diagram similar to that of FIG. 4 depicting an alternative embodiment of the present invention, FIG. 21 is a schematic circuit diagram similar to that of FIG. 12 depicting an alternative embodiment of the present invention, FIG. 22 is a schematic circuit diagram similar to that of FIG. 14 depicting an alternative embodiment of the present invention, and FIG. 23 is a schematic circuit diagram similar to that of FIG. 16 depicting an alternative embodiment of the present invention.

DESCRIPTION OF THE PREFERRED EMBODIMENTS

Referring now to FIG. 1, there is shown a power supply circuit 1 of the type incorporating a current limited voltage regulator 2 of the present invention. More particularly, the primary winding 3 of a transformer 4 is driven with AC power, such as that obtained from 110 volt line to produce AC current of a desired voltage on a secondary 5 of the transformer. The AC output voltage of the secondary 5 is fed through a halfwave rectifier 6 and stored in a smoothing capacitor 7. The current limited voltage regulator 2 has its input connected across the capacitor 7 for applying the unregulated input voltage $V_{IN}$ to the input of the regulator 2. The voltage regulated and current limited output of the voltage regulator 2 is applied across a load resistor 8.

A typical prior art current limited voltage regulator circuit 2 1n shown in FIG. 2. The input voltage $V_{IN}$ is passed through the output stage of a two stage series pass transistor network 9 and current limit sense resistor 12 to a voltage output terminal 11. A voltage divider network 13 is connected across the output terminal 11 of the regulator 2 to ground to derive an output reference sense voltage of reduced amplitude at the node of the divider 13 which is applied to one input of differential amplifier 14 for comparison with a reference voltage $V_r$ derived from a reference voltage source 15 to derive an error signal. The error signal is fed via a blocking diode 16 to the input base terminal 20 of the two-stage series pass transistor network 9 such that the output voltage $V_{out}$ is maintained constant as determined by the reference voltage $V_r$. A constant current source 17 supplies current to the base of the first stage of the series pass transistor network 9.

The output current of the regulator is limited by comparing the current limit sense voltage derived across resistor 12 with the base-to-emitter turn-on voltage $V_{BE}$ ($\approx$0.65 volts) of a current limit control transistor 18. When the current passing through the sense resistor 12 is of such a magnitude as to create a voltage across resistor 12 which exceeds the turn-on voltage of the current limit control transistor 18, the transistor turns on and shunts the drive current from the base of the first stage of the series pass transistor network 9 for limiting the current that can be drawn from the regulator 2.

The output current limiting characteristic for the regulator 2 of FIG. 2 is shown in FIG. 3. Due to the negative temperature coefficient of the base-to-emitter turn-on voltage of the current limit control transistor 18, which is approximately $2 \times 10^{-3}$ volts/°C, the current limiting value $I_{Lim}$ varies greatly with temperature. More particularly, the current limit value $I_{Lim}$ is halved from the value at −55° C when the temperature of the regulator reaches +125° C. The problem with this, in a monolithic integrated circuit design, is that the required size of the circuit chip is directly proportional to the maximum power dissipation in the output series pass transistor. Thus, if the output series pass transistor must pass 2 amps the monolithic circuit chip must be approximately twice the size of the chip required for a maximum 1 amp design. Thus, it is desirable to obtain a monolithic integrated circuit current regulator having substantially a zero temperature coefficient.

Referring now to FIG. 4, there is shown a zero temperature coefficient current limit control circuit 19 for that portion of the voltage regulator circuit of FIG. 2 delineated by line 4—4 and incorporating features of the present invention. The current limiting circuit 19 of FIG. 4 is similar to that of FIG. 2 with the exception that the base-to-emitter voltage $V_{BE}{}^T$ of a temperature compensating transistor 21 has been added into the input circuit of the current control transistor 18 in phase opposition to the base-to-emitter turn-on voltage $V_{BE}{}^C$ of the current control transistor 18. The temperature compensating base-to-emitter voltage $V_{BE}{}^T$ is made substantially smaller than, i.e., greater than 20 mv less than, the base-to-emitter voltage $V_{BE}{}^C$ of the current control transistor 18 by increasing the emitter area and/or decreasing the emitter current of the temperature compensating transistor 21. In a silicon junction transistor, increasing the area of the emitter by a factor of 10 or decreasing the current through the emitter by a factor of 10 produces approximately a 60 mv reduction in the base-to-emitter voltage of the transistor at 25° C.

If the entire base-to-emitter voltage $V_{BE}{}^T$ of the temperature compensating transistor 21 were applied in phase opposition to the base-to-emitter voltage $V_{BE}{}^C$ of the control transistor 18, the current limiting value of the current limiting sense voltage $V_{Llm}$ would then be the difference between these two voltages $\Delta V_{BE}$. In the above example where the emitter area of the temperature compensating transistor 21 is increased by a factor of 10 or the current through the emitter junction is decreased by a factor of 10 relative to the current and/or area of the current control transistor 18 this voltage difference $\Delta V_{BE}$, and thus the current limiting value of the current sense voltage would be approximately 60 millivolts. The entire $V_{BE}{}^T$ of the temperature compensating transistor 21 may be readily applied in phase opposition in the input circuit to the current control transistor 18 by merely interconnecting the base and collector terminals of the temperature compensating transistor 21. Use of the entire base-to-emitter voltage $V_{BE}{}^T$ of the temperature compensating transistor 21 results in a temperature coefficient of the current limit sense voltage of +0.3%/°C, identical in magnitude, but opposite in polarity to the prior art circuit. Curve 22 of FIG. 5 shows the temperature dependence of the base-to-emitter voltage $V_{BE}$ of the current limit control transistor. Curve 23 shows the temperature dependence of the base-to-emitter voltage $V_{BE}{}^T$ of the temperature compensating transistor 21. The cross-hatched region between curves 22 and 23 is a $\Delta V_{BE}$, which is shown to increase from 60 millivolts at 25° C to 80 millivolts at 125° C.

Because no substantial improvement in the temperature coefficient for the current limiting circuit is provided by inserting the entire base-to-emitter voltage $V_{BE}{}^T$ into the input circuit to the current control transistor 18, it is desired to obtain a substantially zero temperature coefficient for the current limiting circuit. This is obtained by inserting a negative temperature coefficient voltage correction having a −0.3%/°C, temperature coefficient to compensate the positive temperature coefficient of the $\Delta V_{BE}$ characteristic. This correction voltage is readily achieved by a voltage divider network of resistors 24 and 25 with the resistance of resistor 25 being connected between the collector and base of transistor 21 and having a resistance of 1/X of the resistance of resistor 24. In this manner, $V_{BE}{}^T/X$ is subtracted from the temperature compensating $V_{BE}{}^T$ as applied in phase opposition to $V_{BE}{}^T$ in the input circuit to the control transistor 18. If the $V_{BE}/X$ thus obtained is equal to $\Delta V_{BE}$, the sum of $\Delta V_{BE}$ and $V_{BE}/X$ generates a current limit sense voltage with a substantially zero temperature coefficient.

When the current through the current sense resistor 12 exceeds the desired current limiting value, the current control transistor 18 is turned on to increase the base drive current on a pnp transistor 26 connected for shunting the base drive current, as of 1 to 10 milliamps obtained from source 17, from the base of the input stage of the series pass transistor network 9, thereby limiting the current in the manner as previously described in regard to FIG. 2 and 3.

The emitter junction areas $A_1$ and $A_2$ of the current control transistor 18 and temperature compensating transistor 21, respectively, are controlled when these transistors are formed on the monolithic circuit. The emitter current of the current control transistor 18 and temperature compensating transistor 21, respectively, is controlled by resistors 27 and 24, respectively. More particularly, the emitter current for the current control transistor 18 is controlled by resistor 27 connected in parallel with the base-to-emitter voltage of the shunt transistor 26, such that one $V_{BE}$ is maintained across resistor 27 for determining and controlling the emitter current of control transistor 18. Resistor 24 is connected in series with the $V_{BE}{}^T$ of the temperature compensating transistor 21, such series connection being in parallel with two $V_{BE}$ drops across the series pass transistor network 9, such that one $V_{BE}$ is maintained across resistor 24. Thus, the value of resistor 24 controls the emitter current of the temperature compensating transistor 21.

The temperature coefficient for the current limiting circuit of FIG. 4 can be expressed and derived mathematically as follows: Current control transistor 18 will be operating at an emitter current $I_1$ equal to $V_{BE}$ (of the shunt transistor 26) over $R_{27}$. The temperature compensating transistor 21 is connected as a diode operating at a current equal to $V_{BE}$ (first pass trasistor) plus $V_{BE}$ (second pass transistor) minus $V_{BE}$ (temperature compensating transistor 21) all over current control transistor 18 and temperature compensating transistor 21, respectively. To a first approximation, assume that $V_{BE}$ of the pass transistors, shunt transistor 26, current control transistor 18 and the temperature compensating transistor 21 are all approximately equal. The current limiting sense voltage for limiting to a predetermined current is then given by:

$$V_{llm} = KT/q\,[\ln(R_{24}/R_{27})(A_1/A_2)] + V_{BE}(R_{25}/R_{24}) \quad (1)$$

where K is Boltsman's Constant, T is temperature in degrees Kelvin, and $q$ is the charge on an electron.

For zero temperature coefficient, it is necessary for the two terms of Eq. (1) to have equal and opposite temperature dependence. Let $V_{BE}$ be represented by $(V_{BEO} - m\Delta t)$ where $V_{BEO}$ is the value of $V_{BE}$ at $T_o$ and $m$ is a multiplier (temperature coefficient) very close to 2mV/degree C for silicon junctions. Rewriting Eq. (1) and taking the derivative with respect to temperature we find:

$$V_{Lim} = KT/q\,[\ln(R_{24}/R_{27} \cdot A_1/A_2)] + (V_{BEO} - m\,\Delta T)\,R_{25}/R_{24} \quad (2)$$

$$d(V_{Lim})/d(T) = KT/q \, [\ln (R_{24}/R_{27} \cdot A_1/A_2)] - m \, R_{25}/R_{24}$$

(3)

Setting Eq. (3) equal to zero yields a relationship for $R_{24}/R_{27} \cdot A_1/A_2$ and $R_{25}/R_{24}$ to obtain zero temperature coefficient for $V_{Lim}$.

$$(K/q \, \ln (R_{24}/R_{27} \cdot A_1/A_2 = m \, R_{24}/R_{25}$$

Typically $R_{24}/R_{27}$, $A_1/A_2 = 10$ This results in $$R_{24}/R_{25} = 0.1 \text{ and } V_{Lim} = 120 \text{ m V}$$

Although the typical example given above calls for $R_{24}/R_{27} \cdot A_1/A_2 = 10$, this is not a requirement as this product may vary widely. For example, this product may equal 100, in which case, the ratio of $R_{24}/R_{25}$ would equal 0.2 and the $V_{Lim}$ voltage would be 240 millivolts. In the case where the aforecited product is equal to 5, the ratio $R_{24}/R_{25}$ equals 0.07 and the $V_{Lim}$ equals 84 millivolts.

The advantage to the current limiting circuit 19 of FIG. 4, aside from having zero temperature coefficient, is that $V_{Lim}$ has been substantially reduced from 0.65 volts, thereby greatly reducing the value of the current sensing resistor 12 and attendant power loss therein.

Referring now to FIG. 6 there is shown an alternative embodiment 31 of the temperature compensated current limiting circuit of the present invention. The current limiting circuit 31 of FIG. 6 is substantially the same as that described with regard to FIG. 4 with the exception that the fractional $V_{BE}^T$ temperature compensating voltage, $V_{BE}^T/X$, previously obtained by the voltage divider network of resistors 24 and 25 is obtained instead by a second current generator 32 producing a current $I_x$ which is proportional to temperature and which will have a sufficient positive temperature coefficient to induce the base-to-emitter voltage of temperature compensating transistor 21 to have a positive current dependent temperature coefficient component to compensate for the positive $\Delta V_{BE}$ temperature coefficient. A current generator 32 for producing an output current $I_x$ which is proportional to temperature is shown in FIG. 7. This circuit includes a first transistor 33 connected as a diode in series with a constant current generator 34. The base-to-emitter voltage of transistor 33 is applied to a pass transistor 35 for producing an output current $I_x$ proportional to temperature.

As an example of how the circuit 31 of FIG. 6 has approximately zero temperature coefficient, assume that the current $I_2$ through the emitter junction of the current limit control transistor 18 is 100 microamps at 25° C. This current $I_2$ will decay to approximately 70 microamps at 125° C. Assuming that the ratio of $I_2/I_x$ is 1 at 25° C then $I_x$ at 125° C is approximately 130 microamps. The ratio of $I_2$ over $I_x$ at +, 25° C is 70 microamps over 130 microamps which is equal to 0.54. Halving the emitter current through the temperature compensating transistor 21 reduces the voltage drop across the base-to-emitter junction, namely, $V_{BE}^T$ of transistor 21 by approximately 20 millivolts which is exactly the amount of temperature compensation required, for a circuit with $(A_1/A_2)(R_{24}/R_{27}) = 10$.

Resistor 36 connected between the base and the collector of temperature compensating transistor 21 is for the purpose of $g_m$ transconductance compensation in the manner as shown in FIG. 8-11. More particularly, temperature compensating transistor 21 is connected as a diode as shown in FIG. 8. When the collector terminal is shorted through the base terminal, the output voltage, i.e., the voltage across the collector to emitter terminal, increases with increased current as shown in FIG. 11 for $R_2 = 0$. However, when a resistor $R_2$ is connected between the base and collector, the output voltage remains relatively constant with variation in current about a certain value of current as shown in FIG. 11. Transistor 21, connected as a diode, has internal resistance $r_d$ as indicated in FIG. 10. When the resistance of resistor $R_2$ is equal to the diode resistance $r_d$, where $r_d = [(KT/q)/I_c]$ then the variation in output voltage for small variation in collector current $I_c$ is near zero. This is shown mathematically as follows: The change in base-to-emitter voltage $\Delta V_{BE}$ with change in current from a first value $I_1$ to a second value $I_2$ is given by:

$$\Delta V_{BE} = (KTq) \ln (I_1/I_2)$$

for $I_1 \approx I_2$, i.e., small changes,:

$$\Delta V_{BE} \approx (\Delta I/I)(KT/q)$$

The change in voltage drop $\Delta V_R$ across $R_2$ is:

$$\Delta V_R = (\Delta I)(R_2)$$
$$\Delta V_{out} = \Delta V_{BE} - \Delta V_R$$
$$\Delta V_{out} = (\Delta I/I \, (KT/q)) - \Delta I \, (R_2)$$

if and only if $R = [(KT/q)/I]$
then $\Delta V_{out} = 0 \, (KT/q)$ at room temperature is equal to 26 mV.

Referring now to FIG. 12 there is shown an alternative embodiment of a temperature compensated current limiting circuit 38 incorporating features of the present invention. Current limiting circuit 38 is substantially the same as that of FIG. 4 with the exception that an additional pass transistor stage 39 is provided with the emitter of the first stage input pass transistor 39 feeding the input base of the two stage pass transistor network 9. The constant current source 17, which now may be of relatively small current, as of 10 microamps, feeds the base of the first input pass transistor stage 39. The shunt transistor 26 is of the same type, namely npn, as the current limiting control transistor 18, with the emitter of the shunting transistor 26 connected to the collector of the current limiting control transistor 18. The base of the shunting transistor 26 is connected to the base of the second input stage of the pass transistor network 9.

In this manner, the emitter junction currents $I_1$ and $I_2$, for the current control transistor 18 and temperature compensating transistor 21, respectively, are stabilized at relatively high values, as of 100 microamps, via resistors 27 and 24 connected in parallel with respective base-to-emitter junctions. The relatively high current for the emitters of the current control transistor 18 and temperature compensating transistor 21 is supplied from the output of the first pass transistor stage 39. Thus, the constant current source 17 can provide relatively low current, as of 10 microamps, and is therefore more readily stabilized by small capacitive elements available in monolithic circuit design.

When the current control transistor 18 is switched to an "on" state for current limiting it drops the potential of the emitter of shunting transistor 26 causing the shunting transistor 26 to turn "on" and to shunt the drive base current from the first stage 39 of the pass transistor bank 9. The input from the operational amplifier 14 of the voltage regulator is applied to the base of the first stage 39 of the pass transistor bank 9.

Referring now to FIG. 13 there is shown an alternative current limiting circuit embodiment 41 incorporating features of the present invention. Current limiting circuit 41 is substantially the same as that of circuit 19 of FIG. 4 with the exception that resistor 25, connected between the base and collector of the temperature compensating transistor 21, has a value for $g_m$ compensation, i.e., is equal to the diode resistance $r_d$ of the transistor 21, for the same reasons as previously advanced with regard to the circuit of FIG. 6.

A second voltage divider consisting of resistors 42 and 43 is connected such that resistor 42 is connected in series with the base-to-emitter voltage drop of the current control transistor 18 and also in series with the collector of the temperature compensating transistor 21. The second resistor 43 of the second voltage divider network is connected in parallel with the base-to-emitter voltage drop of the current control transistor 18 for voltage dividing the base-to-emitter junction drop of the temperature compensating transistor 21 and for applying a portion thereof (i.e. that portion appearing across resistor 42) in phase addition with the base-to-emitter "turn on" voltage of the current control transistor 18. Thus only a portion of the base-to-emitter voltage of the temperature compensating transistor 21 is applied in phase opposition to the base-to-emitter turn on voltage of the current control transistor 18, thereby obtaining zero temperature coefficient for the current control circuit 41 of FIG. 13. In a typical example, resistor 42 has a value of approximately 1/10 of the resistance of resistor 43.

The current limiting control circuit 41 of FIG. 13 is particularly useful when large variations are encountered between the base-to-emitter voltage drops of the temperature compensating transistor 21 and the two series pass transistors of series pass transistor network 9.

Referring now to FIG. 14 there is shown an alternative current limiting circuit 44 incorporating features of the present invention. In the current limiting circuit 44, provision is made for limiting not only the output current but also the output power of the pass transistor network 9. More particularly, circuit 44 is substantially the same as circuit 19, previously described with regard to FIG. 4, with the exception that a voltage divider consisting of resistors 45 and 46 has been connected across the output stage of the pass transistor bank 9.

The voltage divider includes one resistor 46 which is connected in series with the input circuit to the current control transistor 18, such that a voltage is derived across resistor 46 in proportion to the input voltage minus the output voltage ($V_{IN} - V_{OUT}$). Resistor 46 is selected to have a value of resistance which is typically only a small fraction of the resistance of resistor 45, as of 1/100th to 1/500th, of resistance 45. The voltage derived across resistor 46 is applied in phase with the current limit sense voltage derived across resistor 12.

In this manner, as the input voltage minus the output voltage ($V_{IN} - V_{OUT}$) increases it adds to the current limit sense voltage derived across resistor 12 to produce current limiting at a lower value of output current than would be obtained without the resistors 45 and 46. The output voltage versus current output characteristics for the current limiting circuit 44 of FIG. 14 is shown in FIG. 15.

Likewise, when the input voltage $V_{IN}$ is relatively low, the dissipation in the output transistor of the pass transistor network 9 is relatively low and thus the voltage component produced by resistor 46 is lower than normal allowing a higher than normal output limit current. Thus, with the circuit 44 of FIG. 14, relatively wide variations may be obtained in the input voltage without exceeding the power dissipation capabilities of the output pass transistor of the transistor pass network 9.

Referring now to FIG. 16 there is shown an alternative current limiting circuit embodiment 47 incorporating features of the present invention. Circuit 47 is substantially the same as circuit 19 of FIG. 4 with the exception that a voltage divider, consisting of resistors 48 and 49, is connected from the output of the output pass transistor to ground such that the output voltage $V_{out}$ is applied across the voltage divider consisting of resistors 48 and 49.

Resistor 48 of the voltage divider is also connected into the input circuit of the current control transistor 18 such that a small fraction, as of 1/50 to 1/250, of the output voltage is applied into the input circuit of the current control transistor 18 in phase opposition to the current limiting sense voltage derived across resistor 12. The output voltage versus output current characteristics for circuit 47 of FIG. 16 is shown in FIG. 17 and provides what is known in the art as foldback current limiting. More particularly, the voltage drop across resistor 48 serves to reduce the current limiting sense voltage if the output voltage $V_{out}$ falls off.

Referring now to FIG. 18 there is shown, in schematic circuit diagram form, the input circuit loop to the control transistor 18 for the circuits of FIGS. 4, 6, 12, 13, 14 and 16. As thus far described, the temperature compensated current limiting control circuit contemplated a control transistor 18 having a turn-on voltage greater than the temperature compensating base-to-emitter junction voltage of the temperature compensating transistor 21 such that the control transistor 18 would normally be in a non-conductive state until such time as the current limiting sense voltage $V_s$ or $V_{Lim}$ when added to the temperature compensating voltage $V_{BE}^T$ exceeded the turn-on voltage of the control transistor 18. While this is one possible mode of operation, an alternative preferred mode of operation is depicted in FIG. 19.

In FIG. 19, the input circuit loop to the control transistor 18 includes, as before, the base-to-emitter voltage $V_{BE}^T$ of the temperature compensating transistor 21 and the current sense voltage $V_s$. However, in this alternative circuit, the temperature compensating base-to-emitter voltage $V_{BE}^T$ is greater than the turn-on voltage $V_{BE}^C$ of the control transistor 18 such that the control transistor 18 is normally conductive. The output of the control transistor 18 is fed through an inverter stage to shunt the drive current from the base of the pass transistor bank 9. Thus, in this alternative circuit, the current density in the emitter junction of the control transistor 18 is arranged to be substantially less than the current density in the emitter junction of the temperature compensating transistor 21 such that the base-to-emitter turn-on voltage $V_{BE}^C$ of the control transistor 18 will be less than the base-to-emitter junction voltage of the temperature compensating transistor $V_{BE}{}^T$.

Referring now to FIG. 20 there is shown a physical realization of a current limiting circuit 51 incorporating features of the present invention as previously described with regard to FIG. 19. The circuit 51 of FIG. 20 is similar to that of FIG. 4. The input circuit loop to the current control transistor 18 includes the connection of the base-to-emitter electrodes of the control transistor 18 in series with the collector to emitter electrodes of the temperature compensating transistor 21 all in series with the current sense resistor 12.

The base drive current for the temperature compensating transistor 21 is derived from a voltage divider network consisting of resistors 24, 52 and 53 parallel connected with the series connection of base-to-emitter electrodes of the series pass transistor bank 9. The emitter-to-collector terminals of the current control transistor 18 are connected in parallel with the base-to-emitter voltage $V_{BE}$ of the shunt transistor 26 such that the current control transistor 18, in the normally conductive state, shunts the base drive current from the base of the shunt transistor 26 such that shunting transistor 26 is in the normally non-conductive or "off" state.

Also, the base of the shunt transistor 26 is connected to the base of the input transistor of the pass transistor bank 9 via the intermediary of a series resistor 54 such that one $V_{BE}$ voltage drop exists across resistor 54 when transistor 26 is conducting. The value of resistor 54 is chosen such that with one $V_{BE}$ thereacross the collector current to the conductive current control transistor 18 will be of the proper value to provide an emitter junction current density of substantially less than that of the temperature compensating transistor 21, such that $V_{BE}{}^T$ will be at least 20 millivolts greater than $V_{BE}{}^C$. Typically this means that the resistance $R_{54}$ of resistor 54 is up to 10 times greater than the resistance $R_{24}$ of resistor 24.

Also, the resistance $R_{53}$ of resistor 53 in the voltage divider network feeding the base of the temperature compensating transistor 21 should typically have a value three to 10 times greater than the resistance $R_{24}$ of resistor 24. Since resistor 53 is connected in parallel with the base-to-emitter junction of the temperature compensating transistor 21, one $V_{BE}{}^T$ voltage drop appears across resistor 53. Resistor 52 is typically chosen to have a resistance $R_{52}$ of approximately 1/10th of the value of the resistance $R_{53}$ of resistor 53 such that at node 55 there exists a voltage of approximately 1.1 $V_{BE}{}^T$.

Resistor 56 is a $g_m$ compensating resistor and is connected between node 55 and the base of the current control transistor 18 and the collector of the temperature compensating transistor 21 for assuring that the output voltage of the temperature compensating transistor 21 remains constant with variations of the voltage at the base of the series pass transistor bank 9 and with variations in the current through resistor 24. Thus, resistor 56 provides $g_m$ compensation in the manner previously described with regard to FIGS. 6–11. The resistance $R_{56}$ of resistor 56 is given by:

$$R_{56} = \frac{R_{24}\left(\frac{KT}{q}\right)\left(\frac{R_{52}+R_{53}}{R_{53}}\right)}{V_{BE}}$$

$R_{52}$ serves the Δpurpose of $R_{25}$ of FIG. 4, i.e., to obtain substantially a zero temperature coefficient. More particularly $R_{52}$ being 1/10th of $R_{53}$ serves to add a + $V_{BE}{}^T/10$ to $V_{BE}{}^T$ at node 55 and thus in series with the input circuit loop to the current control transistor 18. The addition + $V_{BE}/10$ has a negative temperature coefficient of −0.3%/° C, which just compensates for the positive temperature coefficient of plus 0.3%/° C of $0\Delta V_{BE}$.

The advantage to the current limiting circuit 51 of FIG. 20 is that all of the transistors of the circuit are of the npn type, thereby substantially increasing the high frequency response (pnp's have poor high frequency response only in monolithic integrated circuits) of the circuit and eliminating the previous pnp shunt transistor 26. An all npn transistor circuit configuration can also reduce the physical size of the circuit because npn transistors are smaller than pnp transistors for the same operating current because the npn transistors have a higher frequency cut-off and a higher current gain, smaller compensating capacitors are required for stabilizing the circuit.

Referring now to FIG. 21 there is shown an all npn current limiting circuit 57 similar to the previously described circuit 38 of FIG. 12. An additional series pass transistor stage 39 is provided and the shunt transistor 26 shunts the drive current from the base of the first stage 39 of the pass transistor bank 9.

Referring now to FIG. 22 there is shown an all npn current limiting circuit configuration 58 similar to the circuit 44 of FIG. 14. Power dissipation monitoring resistors 45 and 46 are connected across the collector-to-emitter terminals of the output series pass transistor 9 to supply a voltage across resistor 46 in phase with the current limiting sense voltage derived across current sense resistor 12. The resultant output characteristic is as shown in FIG. 15.

Referring now to FIG. 23, there is shown an alternative all npn transistor current limiting circuit 59 incorporating features of the present invention. Circuit 59 is similar to that of circuit 47 of FIG. 16 in that a voltage divider consisting of resistors 48 and 49 is connected in parallel with the output voltage such that a voltage is derived across resistor 48 which is proportional to the output voltage. This voltage is applied in phase opposition to the current limiting sense voltage derived across resistor 12 in order to obtain a current output versus voltage output characteristic as shown in FIG. 17.

Another advantage of the circuits of the present invention is that the temperature coefficient of the current limit sense voltage can be adjusted from + 0.3%/° C to − 0.3%/° C independent of the actual magnitude of the current limit sense voltage. This is accomplished by varying the relative magnitudes of $V_{BE}{}^T/X$ and $\Delta V_{BE}$. $V_{BE}{}^T/X = 0$ gives +0.3%/°C for the current limit sense voltage and $\Delta V_{BE} = 0$ gives −0.3%/°C for the current limit sense voltage. $V_{BE}{}^T/X = \Delta V_{BE}$ gives zero temperature coefficient. This adjustment of the temperature coefficient allows the circuit designer to tailor the temperature dependence of the current limit value as desired. In particular, the temperature dependence (+ 0.2%/° C) for a typical monolithic diffused current limit sense resistor 12 can be compensated for by appropriate values of $V_{BE}{}^T/X$ and $\Delta V_{BE}$. For example, to obtain zero temperature coefficient for the current limit value using a monolithic resistor 12 with a temperature coefficient of + 0.2%/° C, $\Delta V_{BE}$ is chosen to be four times larger than $V_{BE}{}^T/X$.

In a preferred embodiment of the current limiting circuits of the present invention the temperature compensating and current control transistors are matched as obtained in monolithic construction. Also the current gain $\beta = h_{FE}$ should be greater than 100 for transistors 18 and 21 although $h_{FE}$'s of 50 or less will work with reduced accuracy. The current limiting value of the output current of the current limited circuit should be greater than 10 times the sum current flow through transistors 18, 21 and 26 in the current limiting state. Also the current limiting value of current sense voltage should be larger by at least a factor of ten than any mismatch in transistors 18 and 21. Thus the smallest current limiting value of current sense voltage is preferably greater than 20 mV.

What is claimed is:

1. In a current limiting circuit, means for sensing the current to be limited and for deriving a current sense voltage proportional to the current to be limited, current limiting means for limiting the current flowing through said current sensing means, said current limiting means including a current control transistor responsive to said current sense voltage for generating a current limiting signal to cause said current limiting means to limit the current to said current sensing means when the current sense voltage exceeds a current limiting value, a current limiting input circuit interconnecting said current control transistor and said current sense means, said current limiting input circuit means including means for developing and applying in circuit with and in phase opposition to the base-to-emitter turn on diode junction voltage drop of said current control transistor at least a substantial portion of a second diode junction voltage drop of different magnitude than said base-to-emitter turn on diode junction voltage drop of said current limiting transistor for creating a difference voltage in said current limiting input circuit in series with said current sense voltage, whereby the magnitude of said current sense voltage is reduced to a value substantially less than said turn on base-to-emitter voltage drop of said current control transistor means.

2. The apparatus of claim 1 wherein said turn on base-to-emitter voltage drop of said current control transistor exceeds the second diode junction voltage drop, and wherein said current sense voltage is applied in phase opposition in said input circuit to said base-to-emitter voltage drop of said current control transistor.

3. The apparatus of claim 1 wherein said turn on base-to-emitter voltage drop of said current control transistor is less than said second diode junction voltage drop, and wherein said current sense voltage is applied in phase addition in said input circuit to said base-to-emitter voltage drop of said current control transistor.

4. The apparatus of claim 1 wherein said means for developing and applying said second diode junction voltage drop in circuit with said base-to-emitter junction of said current control transistor includes, a second transistor connected as a diode with its base connected to its collector and connected with its collector and emitter terminals in series circuit relation with the base terminal of said current control transistor, and said collector-to-emitter connection of said second transistor being polarized for conduction of current in a direction away from said base terminal of said current control transistor.

5. The apparatus of claim 2 wherein said means for developing and applying at least a substantial portion of said second diode junction voltage drop in circuit with and in phase opposition to said base-to-emitter junction voltage of said current control transistor includes, means for developing said second diode junction voltage drop and for applying only a portion of said developed second diode junction voltage drop in phase opposition with said base-to-emitter junction voltage drop of said current control transistor.

6. The apparatus of claim 3 wherein said means for developing and applying at least a substantial portion of said second diode junction voltage drop in circuit with and in phase opposition to said base-to-emitter junction voltage drop of said current control transistor includes, means for developing said second diode junction voltage drop plus a substantial fraction of said second diode junction voltage drop and for applying both of said developed voltage drops in said input circuit means in phase opposition with said base-to-emitter junction voltage drop of said current control transistor.

7. The apparatus of claim 1 wherein said means for developing and applying said second diode junction voltage drop includes, a second diode junction, and a current source for supplying current to said second diode junction, and said current source providing current to said second diode junction in proportion to the temperature of said current source.

8. The apparatus of claim 1 wherein said current limiting means includes, series pass transistor means having base, emitter and collector terminals connected for passing current through said current sensing means, current source means connected for supplying base drive current to said base terminal of said current pass transistor means, shunt transistor means connected for selectively removing the base drive current from the base terminal of said pass transistor means in response to said current limiting output signal of said current control transistor means.

9. The apparatus of claim 8 wherein said current source means also sources base current for said shunt transistor means and for the collector-to-emitter current of said current control transistor means, and including a parallel connection of a current controlling resistor and the emitter-to-base diode junction voltage drop of said shunt transistor means, and wherein the collector terminal of said current control transistor is connected to said current source means via said parallel connection of said current control resistor and said emitter-to-base diode junction of said shunt transistor means.

10. The apparatus of claim 9 wherein said current source means is connected for sourcing current to said second diode junction, a second current control resistor series connected between said current source means and said second diode junction, said series pass transistor means including a pair of series connected base-to-emitter junctions parallel connected with said series connection of said second current control resistor and said second diode junction for developing one base-to-emitter voltage drop across said second current control resistor.

11. The apparatus of claim 10 wherein the reistances of said first and second current control resistors are proportioned relative to each other and the emitter junction areas of said current control transistor and of said second diode junction are proportioned relative to each other for causing the voltage drop of said second diode junction to be substantially less than that of said current limiting control transistor.

12. The apparatus of claim 5 wherein said means for developing said second diode junction voltage drop includes a temperature compensating transistor connected as a diode and connected with its collector and emitter terminals in circuit with the base terminal of said current control transistor, and said temperature compensating transistor being connected with its collector-to-emitter terminals connection polarized for conduction in direction away from said base terminal of said current control transistor, and including a resistor connected between the collector and base terminals of said temperature compensating transistor for reducing that portion of the base-to-emitter diode junction voltage of said temperature compensating transistor that is applied in circuit with said base terminal of said current control transistor.

13. The apparatus of claim 8 wherein said series pass transistor means includes a connection of first, second and third pass transistors each having base, emitter and collector terminals with the base-to-emitter junctions of said three pass transistors connected in series, and said current source means connected for supplying base current to said first pass transistor, a parallel connection of a current control resistor and an emitter-to-base diode junction of a shunt transistor means, the collector terminal of said current control transistor means being connected to the emitter of said first pass transistor via the intermediary of said parallel connection of said current control resistor and said emitter-to-base diode junction of said shunt transistor means.

14. The apparatus of claim 13 including, a second current control resistor, said second diode junction being connected to said emitter terminal of said first pass transistor via the intermediary of said second current control resistor, and wherein said second current control resistor and said second diode junction are parallel connected with said series connection of said second and third base-to-emitter diode junctions of said second and third pass transistor means.

15. The apparatus of claim 1 wherein said means for developing said second diode junction voltage drop includes, a temperature compensating transistor connected as a diode and connected with its collector and emitter terminals in circuit with the base terminal of said current control transistor, said temperature compensating transistor being connected with its collector-to-emitter terminal connection polarized for conduction of current in a direction away from said base terminal of said current control transistor, a transconductance compensating resistor connected between the collector and base terminals of said temperature compensating transistor, and wherein said compensating resistor is of a value of resistance approximately equal to the diode resistance of said temperature compensating diode junction.

16. The apparatus of claim 5 wherein said means for applying only a portion of said developed second diode voltage drop in phase opposition with said base-to-emitter junction voltage of said current control transistor means includes, voltage divider means parallel connected with said second diode junction, and means for connecting the base terminal of said current control transistor to a node of said voltage divider means.

17. The apparatus of claim 8 including means for sensing the power dissipation of said pass transistor means for deriving a power dissipation sense voltage in accordance therewith and means for applying said power dissipation sense voltage into said input circuit means to said base-to-emitter diode junction voltage drop of said current control transistor means in phase addition with said current sense voltage, for limiting the power in said pass transistor means of said current limiting circuit.

18. The apparatus of claim 17 wherein said power sensing means includes, potential divider means parallel connected with the collector-to-emitter terminals of said pass transistor means, and means for applying a portion of the potential drop across said potential divider means in circuit with said base-to-emitter junction of said current control transistor means.

19. The apparatus of claim 8 including, output voltage sensing means for deriving a voltage signal proportional to the output voltage of said current limited circuit, and means for applying said derived voltage signal into said input circuit to said current control transistor in phase opposition with said current sense voltage for reducing the limiting value of current with decreasing output voltage of said current limited circuit.

20. The apparatus of claim 19 wherein said voltage sensing means includes, potential divider means connected for dropping substantially the output voltage of said current limiting circuit thereacross and a portion of said potential divider means connected in said input circuit to said current control transistor such that the potential drop across said portion of said potential divider is connected in phase opposition with said current sense voltage.

21. The apparatus of claim 1 wherein said current control transistor means and said means for developing said second diode junction voltage drop utilize a matched pair of transistors.

22. The apparatus of claim 8 wherein all of said transistors are npn transistors.

* * * * *